United States Patent [19]

Ferguson et al.

[11] Patent Number: 5,757,158
[45] Date of Patent: May 26, 1998

[54] ADAPTIVE OPERATOR CONTROL FOR A COMPACTOR

[75] Inventors: Alan L. Ferguson; Conrad G. Grembowicz, both of Peoria, Ill.

[73] Assignee: Caterpillar Paving Products Inc., Miineapolis, Minn.

[21] Appl. No.: 613,775

[22] Filed: Feb. 28, 1996

[51] Int. Cl.$^6$ .................................................. H01H 39/42
[52] U.S. Cl. ........................... 318/575; 318/543; 318/546
[58] Field of Search ........................... 318/575, 543–551; 180/167, 168

[56] References Cited

U.S. PATENT DOCUMENTS

| | | | |
|---|---|---|---|
| 5,002,454 | 3/1991 | Hadank et al. | 414/695.5 |
| 5,038,887 | 8/1991 | Sousek | 180/329 |
| 5,456,332 | 10/1995 | Borenstein | 180/167 |
| 5,552,983 | 9/1996 | Thornberg et al. | 364/424.01 |

*Primary Examiner*—Brian Sircus
*Attorney, Agent, or Firm*—David M. Masterson

[57] ABSTRACT

A control device for operating a machine is disclosed. The control device includes a joystick having a central axis and being universally moveable along a first and second axis in a plane perpendicular to the central axis, and a rotatable operator control station that houses the joystick. A joystick position sensor senses the position of the joystick and responsively generates a set of operator command signals corresponding to the displacement and direction of the joystick from the central axis in the first and second axis. A operator station position sensor senses the rotational position of the operator station and responsively generates a position signal. A controller receives the operator command and position signals, and responsively transposes the function of the joystick axis to correspond to the orientation of the machine.

4 Claims, 3 Drawing Sheets

Fig-1-

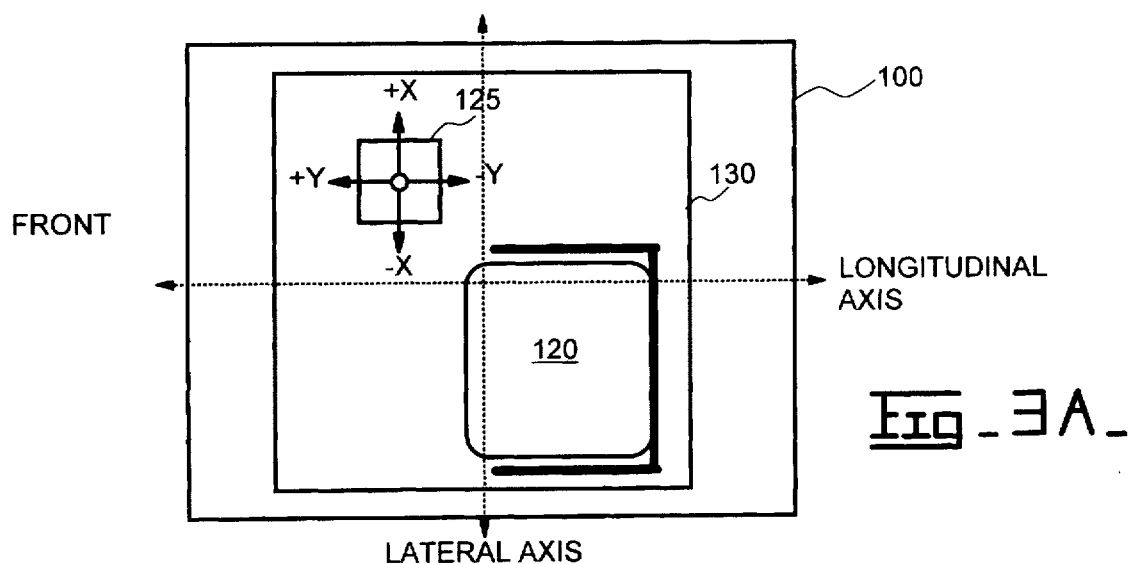
Fig-3A-
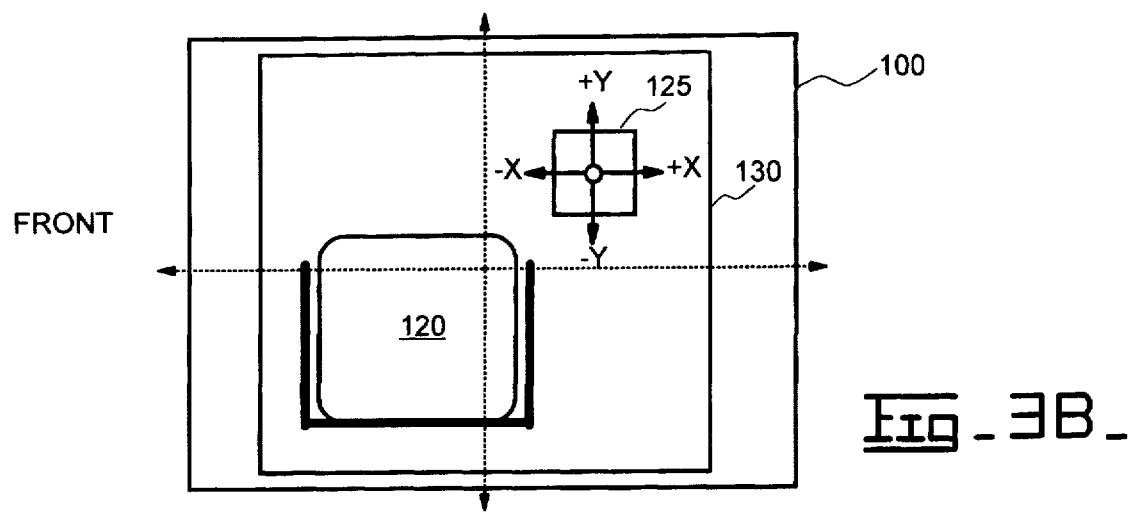
Fig-3B-
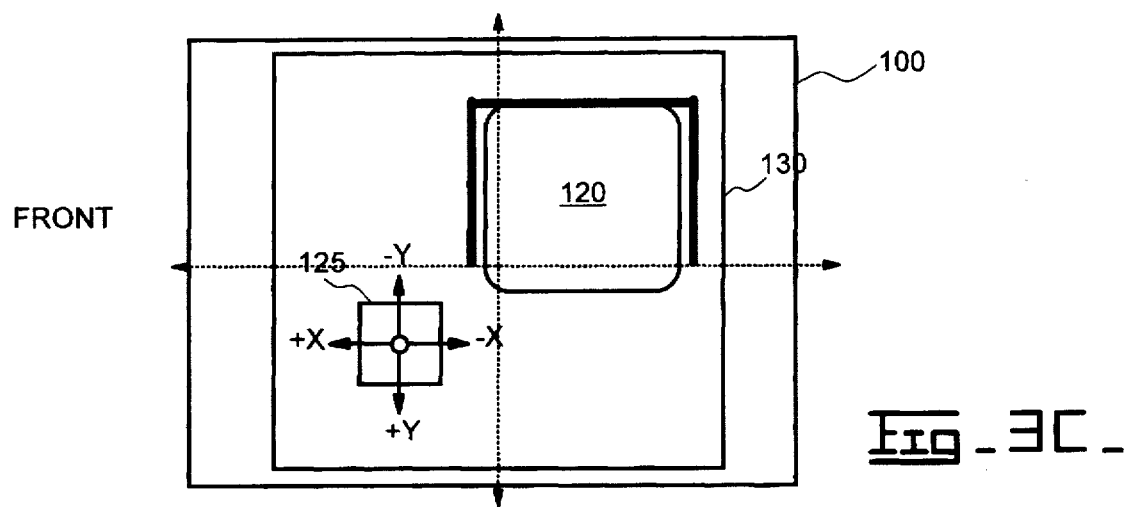
Fig-3C-

ADAPTIVE OPERATOR CONTROL FOR A COMPACTOR

TECHNICAL FIELD

This invention relates generally to an operator control for a compactor and, more particularly, to an operator control that is adaptive to the orientation of the operator's control station.

BACKGROUND ART

Work machines, such as asphalt compactors, utilize much of its running time making short forward and reverse passes behind a paver in order to compact newly deposited asphalt. In this manner, the machine spends just as much time traveling in the forward direction as it does traveling in the reverse direction. In many job applications, monitoring the clearance along the side of the machine is critical. Consequently, the operator station on these type of machines is typically positional or rotatable along a 180° arc in order to improve the operator's visibility along the side of the machine. However, because the operator controls rotate with the operator station, the operation of the controls may become confusing to the operator. Consequently, a operator control device that is made consistent with the orientation of the operator station is desired.

The present invention is directed to overcoming one or more of the problems as set forth above.

DISCLOSURE OF THE INVENTION

In one aspect of the present invention, a control device for operating a machine in forward and reverse directions is disclosed. The control device includes a joystick being universally moveable along a first and second axis in a plane perpendicular to the central axis, and a rotatable operator control station that houses the joystick. A joystick position sensor senses the position of the joystick and responsively generates a set of operator command signals corresponding to the displacement and direction of the joystick from the central axis in the first and second axis. A operator station position sensor senses the rotational position of the operator station and responsively generates a position signal. A controller receives the operator command and position signals, and responsively transposes the function of the joystick axis to correspond to the orientation of the machine.

BRIEF DESCRIPTION OF THE DRAWINGS

For a better understanding of the present invention, reference may be made to the accompanying drawings in which:

FIG. 3 shows various top level views of the asphalt compactor.

BEST MODE FOR CARRYING OUT THE INVENTION

Figure 1:
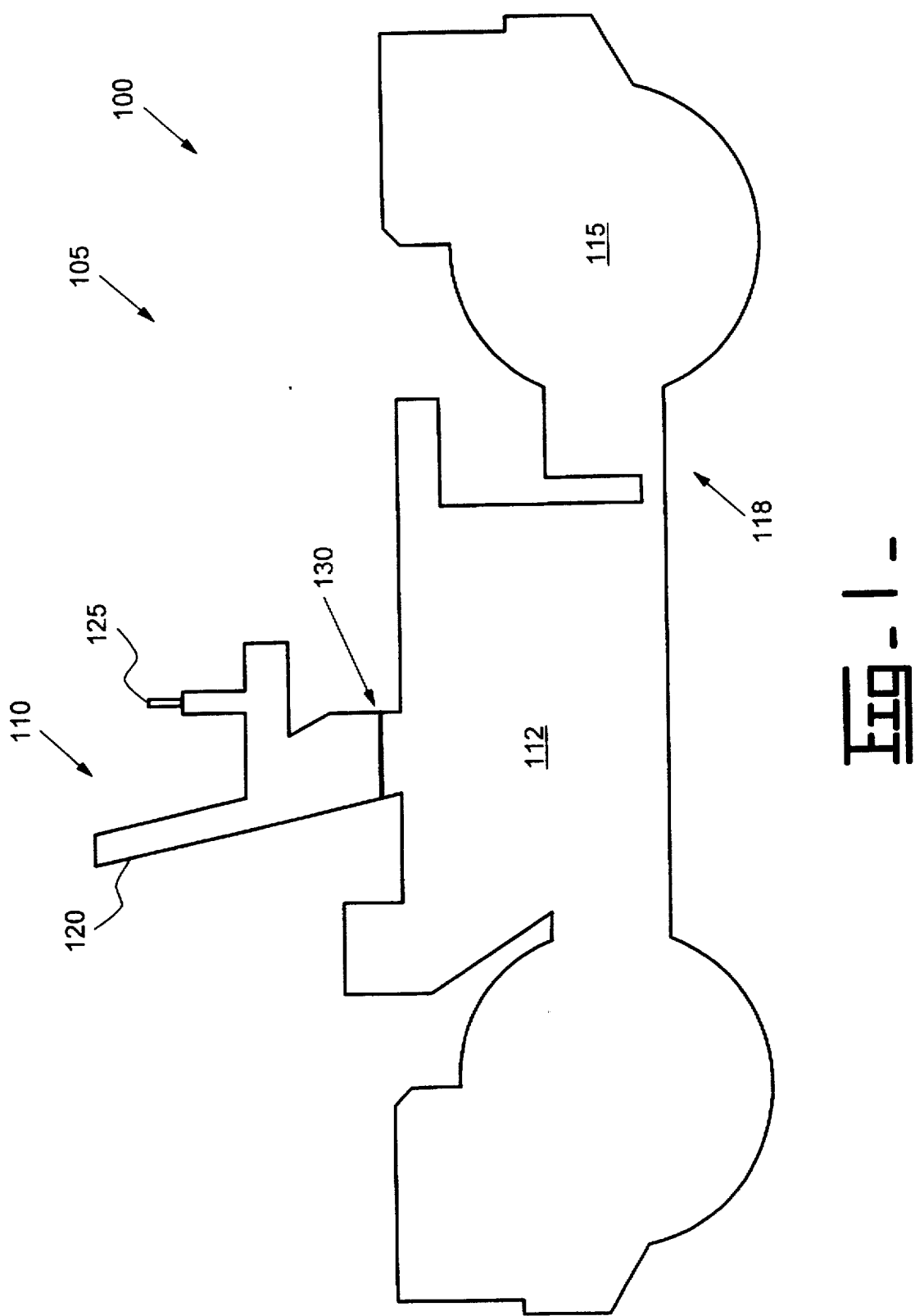
FIG. 1 shows a side profile of an asphalt compactor.

The present invention is directed toward adapting the functionality of the operator controls of a machine to be consistent with the machine's orientation as the orientation of an operator station changes. Referring to FIG. 1, an example of a work machine 100 that has a rotatable operator station 110 is shown. One is example of such a work machine is an asphalt compactor 105. The illustrated compactor 105 includes a main chassis 112 that is connected to a front portion of the machine 115 through an articulation joint 118. The operator station 110 includes an operator seat 120 that is mounted on platform 130, which is rotatable in a 180° arc between a plurality of positions. An electric motor (not shown) or the like, may provide the power to rotate the operator station in response to commands by the operator. The operator station 110 additionally includes an electronic joystick 125 that produces operator commands to steer and propel the machine.

Figure 2:
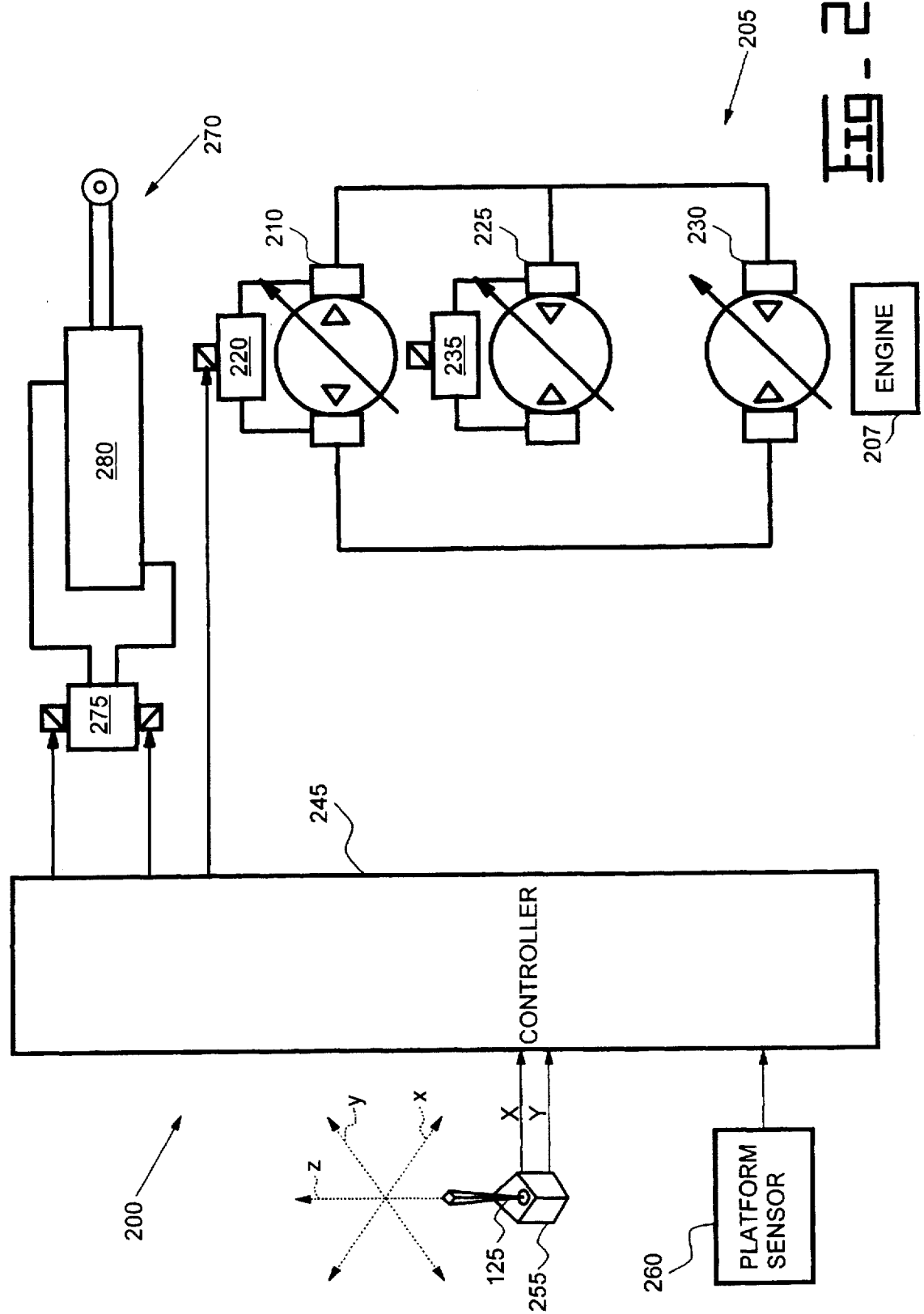
FIG. 2 shows a block diagram of an electronic control system for the copactor.

Referring now FIG. 2, an electronic control system 200 is shown in relation to an hydrostatic drive and steering system 205 of the machine. The hydrostatic drive system 205 includes a prime mover 207, preferably an internal combustion engine, that drives a variable displacement hydraulic pump 210. The swash plate of the pump 210 is actuatable by a displacement solenoid 220. Preferably, the pump 210 includes a directional solenoid 220 that controls the pump's output flow magnitude and flow direction (either forward or reverse). The pump 210 provides high pressure fluid to two parallel connected fixed displacement motors 225,230. The motors 225,230 are used to provide the necessary torque in order to propel the machine. Although a single pump is shown, it will be apparent to those skilled in the art that the present invention will equally be applicable to multiple pump and motor arrangements.

The hydrostatic steering system 270 includes a proportional control valve 275 that regulates the amount of fluid flow to a hydraulic steering cylinder 280. The hydraulic steering cylinder 280 is connected between the compactor chassis 112 and the front portion of the machine 115. The control system 200 regulates the amount of cylinder extension of the hydraulic steering cylinder 280 in order to control the articulation of the machine, which in turn, controls the machine steering.

The control system 200 includes a microprocessor based controller 245 that includes system memory. The controller 245 receives various sensing signals and controls the swash plate of the pump 210 and control valve 275. The joystick 125 provides operator command signals indicative of a desired travel speed and direction (forward or reverse) of the machine. Further, the joystick 125 provides for operator command signals indicative of a desired steering direction of the machine. For example, the joystick 125 has a central axis that extends longitudinally with the joystick. The joystick is universally moveable along a first and second axis in a plane perpendicular to the central axis. Accordingly, a joystick position sensor 255 senses the position of the joystick and responsively generates a set of operator command signals that correspond to the displacement and direction of the joystick from the central axis in the first and second axis. Moreover, a platform sensor 260 senses the rotational position of the operator station and responsively generates a position signal corresponding to the operator station being in a first, second, or third position.

The controller 245 receives the operator command and position signals, and responsively transposes the function of the joystick axis to correspond to the orientation of the machine as the operator station is rotated. More particularly, the controller 245 translates or transposes the joystick axis such that the joystick axis that runs longitudinal with the machine is made to correspond to the direction of travel and travel speed, and the joystick axis that is transverse to the longitudinal axis is made to correspond to the steering direction of the machine. This is better understood in relation to FIG. 3.

Shown in FIG. 3A, the operator station is rotated to a first position where the operator seat faces the front of the machine. Accordingly, the controller 245 modifies the functionality of the first joystick axis or Y-axis such that a joystick deflection in the positive Y-axis direction corresponds to a desired travel speed command in the forward direction. Similarly, a joystick deflection in the negative Y-axis direction corresponds to a desired travel speed command in the reverse direction. Additionally, the controller 245 modifies the functionality of the second joystick axis or X-axis such that a joystick deflection in the positive X-axis direction corresponds to a right steering command, while a joystick deflection in the negative X-axis direction corresponds to a left steering command.

Shown in FIG. 3B, the operator station is rotated to a second position where the operator seat faces the right side of the machine. Accordingly, the controller 245 modifies the functionality of the second joystick axis or X-axis such that a joystick deflection in the negative X-axis direction corresponds to a desired travel speed command in the forward direction. Similarly, a joystick deflection in the positive X-axis direction corresponds to a desired travel speed command in the reverse direction. Additionally, the controller 245 modifies the functionality of the first joystick axis or Y-axis such that a joystick deflection in the positive Y-axis direction corresponds to a right steering command, while a joystick deflection in the negative Y-axis direction corresponds to a left steering command.

Shown in FIG. 3C, the operator station is rotated to a third position where the operator seat faces the left side of the machine. Accordingly, the controller 245 modifies the functionality of the second joystick axis or X-axis such that a joystick deflection in the positive X-axis direction corresponds to a desired travel speed command in the forward direction. Similarly, a joystick deflection in the negative X-axis direction corresponds to a desired travel speed command in the reverse direction. Additionally, the controller 245 modifies the functionality of the first joystick axis or Y-axis such that a joystick deflection in the negative Y-axis direction corresponds to a right steering command, while a joystick deflection in the positive Y-axis direction corresponds to a left steering command.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is particularly suited for use on machines where the orientation of the operator station frequently changes in order to improve visibility or ease of operation. As described, the present invention provides for the operation of the machine controls to be made logical and consistent with the longitudinal and lateral axis of the machine.

Other aspects, objects and advantages of the present invention can be obtained from a study of the drawings, the disclosure and the appended claims.

We claim:

1. A control device for a machine having a longitudinal axis and a lateral axis transverse to the longitudinal axis, comprising:

a joystick having a central axis and being universally moveable along a first and second axis in a plane perpendicular to the central axis;

joystick position sensing means for sensing the position of the joystick and responsively generating a set of operator command signals corresponding to the displacement and direction of the joystick from the central axis in the first and second axis;

a rotatable operator control station that houses the joystick, the operator station being rotatable between a plurality of positions;

operator station position sensing means for sensing the rotational position of the operator station and responsively generating a position signal; and controlling means for receiving the operator command and position signals, and responsively transposing the functionality of the joystick axis relative to the machine axis.

2. A device, as set forth in claim 1, wherein the controlling means modifies the functionality of the joystick axis such that the joystick axis that runs longitudinal with the machine is made to correspond to the direction of travel and travel speed, and the joystick axis that is transverse to the longitudinal axis is made to correspond to the steering direction of the machine.

3. A method for operating a machine having a longitudinal axis and a lateral axis that is transverse to the longitudinal axis, the machine including a joystick having a central axis that is universally moveable along a first and second axis in a plane perpendicular to the central axis, and a rotatable operator control station that houses the joystick, the operator station being rotatable between a plurality of positions; comprising the steps of:

sensing the position of the joystick and responsively generating a set of operator command signals corresponding to the displacement and direction of the joystick from the central axis in the first and second axis;

sensing the rotational position of the operator station and responsively generating a position signal corresponding to the rotational position of the operator station; and receiving the operator command and position signals, and responsively transposing the functionality of the joystick axis to be consistent with the machine axis as the operator station rotates.

4. A method, as set forth in claim 3, including the steps of modifying the functionality of the joystick axis such that the axis that runs longitudinal with the machine is made to correspond to the direction of travel and travel speed, and the joystick axis that is transverse to the longitudinal axis is made to correspond to the steering direction of the machine.

* * * * *